United States Patent [19]
Hirose

[11] Patent Number: 5,431,608
[45] Date of Patent: Jul. 11, 1995

[54] METHOD AND DEVICE FOR CONTROLLING CLUTCH OF AUTOMOTIVE AUTOMATIC TRANSMISSION

[75] Inventor: Ikuo Hirose, Fuji, Japan
[73] Assignee: JATCO Corporation, Fuji, Japan
[21] Appl. No.: 25,563
[22] Filed: Mar. 3, 1993
[30] Foreign Application Priority Data
   Mar. 6, 1992 [JP] Japan .................................. 4-084765
[51] Int. Cl.6 ................................................ F16H 61/06
[52] U.S. Cl. ...................... 477/152; 477/154; 477/155; 475/123; 475/129
[58] Field of Search ............... 74/866; 475/123, 128, 475/129; 477/152, 154, 155

[56] References Cited

U.S. PATENT DOCUMENTS

| | | | |
|---|---|---|---|
| 3,823,621 | 7/1974 | Kubo et al. ................. | 475/128 X |
| 4,274,307 | 6/1981 | Iwanaga et al. . | |
| 4,722,247 | 2/1988 | Shindo et al. .............. | 74/866 |
| 4,807,496 | 2/1989 | Hayasaki et al. .......... | 74/866 |
| 4,930,375 | 6/1990 | Yamamoto et al. ........ | 477/152 |
| 5,005,441 | 4/1991 | Narita ......................... | 74/866 |
| 5,038,638 | 8/1991 | Hayakawa et al. . | |
| 5,072,390 | 12/1991 | Lentz et al. ............... | 477/155 |
| 5,079,970 | 1/1992 | Butts et al. . | |
| 5,086,668 | 2/1992 | Fujiwara et al. . | |
| 5,095,775 | 3/1992 | Ueki . | |
| 5,109,733 | 5/1992 | Ishikawa et al. .......... | 74/866 X |
| 5,131,295 | 7/1992 | Kodama ..................... | 74/866 X |
| 5,179,875 | 1/1993 | Brown ....................... | 477/154 |
| 5,249,483 | 10/1993 | Iizuka ........................ | 74/866 |
| 5,329,830 | 7/1994 | Kitagawa et al. ......... | 477/117 |

FOREIGN PATENT DOCUMENTS

| | | |
|---|---|---|
| 2502347 | 7/1976 | Germany . |
| 2934921 | 3/1980 | Germany . |
| 3600756 | 7/1987 | Germany . |
| 3906269 | 3/1990 | Germany . |
| 3936115 | 5/1990 | Germany . |
| 4006304 | 9/1990 | Germany . |

Primary Examiner—Michael Koczo
Attorney, Agent, or Firm—Foley & Lardner

[57] ABSTRACT

An automotive automatic transmission has a hydraulically operated clutch device and an electronic control unit. The clutch device includes drive and driven clutch plates and a piston for pressing the drive and driven clutch plates to establish an engagement therebetween when an oil chamber for the piston is fed with a certain amount of fluid. In order to control the clutch device, the following steps are employed, which are (a) issuing a first instruction signal to the clutch device; (b) feeding the oil chamber with the fluid by an amount which is sufficient for moving the piston from a rest position to a critical position which is ready for effecting the actual pressure against the drive and driven clutch plates; (c) issuing a second instruction signal to the clutch device; and (d) increasing the hydraulic pressure in the oil chamber to cause the piston to instantly establish the engagement between the drive and driven clutch plates.

15 Claims, 5 Drawing Sheets

FIG.3

| | C-18 | C-20 | C-24 | B-28 | B-26 | OWC-29 | GEAR RATIO | $\alpha_1 = 0.440$ $\alpha_2 = 0.493$ |
|---|---|---|---|---|---|---|---|---|
| 1'ST-SP. | | | ○ | | (○) | ○ | $\dfrac{1+\alpha_2}{\alpha_2}$ | 3.027 |
| 2'ND-SP. | | | ○ | ○ | | | $\dfrac{\alpha_1+\alpha_2+\alpha_1\cdot\alpha_2}{\alpha_2(1+\alpha_1)}$ | 1.619 |
| 3'RD-SP. | | ○ | ○ | | | | 1 | 1.000 |
| 4'TH-SP. | | ○ | | ○ | | | $\dfrac{1}{1+\alpha_1}$ | 0.694 |
| REVERSE | ○ | | | | ○ | | $-\dfrac{1}{\alpha_1}$ | -2.272 |

D-RANGE (○) : OPERATED ONLY UNDER ENGINE BRAKE

METHOD AND DEVICE FOR CONTROLLING CLUTCH OF AUTOMOTIVE AUTOMATIC TRANSMISSION

BACKGROUND OF THE INVENTION

1. Field of the Invention

This application has relation to U.S. Pat. Nos. 5,191,815, 5,203,235, 5,233,889, 5,305,665 and 5,249,483.

The present invention relates in general to automatic transmissions of motor vehicles, and more particularly, a method and a device for controlling a hydraulically operated clutch of the automatic transmissions.

2. Description of the Prior Art

In order to clarify the task of the present invention, one device for electronically controlling the clutch of the automatic transmissions will be described, which is disclosed in European Patent Application No. 0339663A1.

In the disclosed device, for effecting 4→3 shifting, a clutch is subjected to a change from OFF (viz., disengaged) condition to ON (viz., engaged) condition, and at the same time, a brake is subjected to a change from ON (viz., engaged) condition to OFF (viz., disengaged) condition. The engagement of the clutch and disengagement of the brake are carried out in a given timing. That is, if the disengagement of the brake is carried out much earlier than the engagement of the clutch, the transmission is forced to have a relatively long neutral condition which causes undesired racing of the engine, and if the engagement of the clutch is carried out much earlier than the disengagement of the brake, the transmission is forced to have, for a relatively long time, an interlocked condition wherein both the clutch and the brake keep their engaged conditions which causes a marked shift shock.

In view of these facts, the above-mentioned European Patent application proposes a measure in which the hydraulic pressure of the clutch at the time of the 4→3 shifting is controlled. That is, a feedback control is effected to control the acceleration of an input rotation to a desired level. This feedback control deals with a certain time lag which would occur between the time when a control unit issues an instruction signal for engaging the clutch and the time when the clutch actually starts the engaging movement thereof. In fact, the delayed movement of the clutch is caused by the time lag between the time when, upon issuance of the instruction signal, feeding of hydraulic pressure to the oil chamber of the clutch starts and the time when, due to the increased pressure in the oil chamber, the piston of the clutch actually presses the drive and driven clutch plates to effect the engagement therebetween. In the disclosed measure, taking account of the inevitable delayed movement of the clutch, the instruction signal for the clutch engagement is issued earlier by a degree corresponding to the delayed time. Furthermore, in view of unavoidable dispersion of the delayed time in each friction unit of the transmission and unavoidable fluctuation of the delayed time in accordance with the operation condition of the transmission, correction is constantly made to the delayed time by using a learning control.

However, due to its inherent arrangement as described hereinabove, the disclosed device is compelled to have a complicated operation program for the electronic control unit, which causes complicated and expensive construction of the device and thus that of the transmission.

SUMMARY OF THE INVENTION

It is therefore an object of the present invention to provide a method and a device for electronically controlling a clutch of an automotive automatic transmission, which is free of the above-mentioned drawback.

According to a first aspect of the present invention, there is provided a method for controlling a hydraulically operated clutch device of an automotive automatic transmission. The transmission has an electronic control unit and the clutch device includes drive and driven clutch plates, means for defining an oil chamber, and a piston for pressing the drive and driven clutch plates to establish an engagement therebetween when the oil chamber is fed with a certain amount of fluid. The method comprises by steps (a) issuing a first instruction signal to the clutch device; (b) feeding the oil chamber with the fluid by an amount which is sufficient for moving the piston from a rest position to a critical position which is ready for effecting the actual pressure against the drive and driven clutch plates; (c) issuing a second instruction signal to the clutch device; and (d) increasing the hydraulic pressure in the oil chamber to cause the piston to instantly establish the engagement between the drive and driven clutch plates.

According to a second aspect of the present invention, there is provided a control device for controlling a hydraulically operated clutch of an automotive automatic transmission. The transmission has an electronic control unit. The clutch device includes drive and driven clutch plates, means for defining an oil chamber, and a piston for pressing the drive and driven clutch plates to establish an engagement therebetween when the oil chamber is fed with a certain amount of fluid. The control device comprises an electronic control unit which issues first and second instruction signals to the clutch device, the first instruction signal being issued prior to the second instruction signal; a first hydraulic circuit which, upon issuance of the first instruction signal, feeds the oil chamber with the fluid by an amount which is sufficient for moving the piston from a rest position to a critical position which is ready for effecting the actual pressure against the drive and driven clutch plates; and a second hydraulic circuit which, upon issuance of the second instruction signal, increases the hydraulic pressure in the oil chamber to cause the piston to instantly establish the engagement between the drive and driven clutch plates.

According to a third aspect of the present invention, there is provided a control device for controlling a hydraulically operated clutch device of an automotive automatic transmission. The transmission has an electronic control unit, and the clutch device includes drive and driven clutch plates, means for defining a clutch oil chamber, and a clutch piston for pressing the drive and driven clutch plates to establish an engagement therebetween when the oil chamber is fed with a certain amount of fluid. The control device comprises a clutch charging accumulator having first and second oil chambers which are partitioned by a first piston, the first oil chamber being connected through a first oil passage to the clutch oil chamber and the second oil chamber being connected to a second oil passage; a lower pressure adjusting valve which is capable of outputting an adjusted lower hydraulic pressure to a third oil passage; a shift valve which switches between engaged and disengaged positions in response to a hydraulic pressure applied thereto, the engaged position being a position wherein a line pressure passage is connected with the second oil passage while keeping the hydraulic pressure in the first oil passage, and the disengaged position being a position wherein the hydraulic pressure in the second oil passage is drained while connecting the first and third oil passages; a timing valve which switches between communication and shut-off positions in response to a hydraulic pressure applied thereto, the communication position being a position wherein the first and second oil passages are connected and the shut-off position being a position wherein the first and second oil passages are disconnected while keeping the hydraulic pressure in the first oil passage; a shift solenoid valve which, upon receiving a first instruction signal from the electronic control unit, controls the hydraulic pressure applied to the shift valve; and a timing solenoid valve which, upon receiving a second instruction signal from the electronic control unit, controls the hydraulic pressure applied to the timing valve to cause the timing valve to assume the communication position, the second instruction signal being issued after the first instruction signal.

According to a fourth embodiment of the present invention, there is provided a control device for controlling a hydraulically operated clutch device of an automotive automatic transmission. The transmission has an electronic control unit and the clutch device includes drive and driven clutch plates, means for defining a clutch oil chamber, and a clutch piston for pressing the drive and driven clutch plates to establish an engagement therebetween when the oil chamber is fed with a certain amount of fluid. The control device comprises a clutch charging accumulator having first and second oil chambers which are partitioned by a first piston, the first oil chamber being connected through a first oil passage to the clutch oil chamber and the second oil chamber being connected to a second oil passage; a lower pressure adjusting valve which is capable of outputting an adjusted lower hydraulic pressure to a third oil passage; a shift valve which switches between engaged and disengaged positions in response to a hydraulic pressure applied thereto, the engaged position being a position wherein a line pressure passage is connected with the second oil passage while keeping the hydraulic pressure in the first oil passage, and the disengaged position being a position wherein the hydraulic pressure in the second oil passage is drained while connecting the first and third oil passages; a one-way valve arranged between the first and second oil passages, the one-way valve blocking the communication between the first and second oil passages when the hydraulic pressure in the first oil passage is higher than that in the second oil passage, the one-way valve permitting a fluid flow from the second oil passage to the first oil passage when the hydraulic pressure in the second oil passage is higher than that in the first oil passage; a clutch shock damping accumulator which is arranged to damp the rising rate of the hydraulic pressure in the second oil passage; a timing valve which switches between communication and drain positions in response to a hydraulic pressure applied thereto, the communication position being a position wherein a hydraulic pressure passage for controlling the accumulator is connected with a back pressure chamber of the clutch shock damping accumulator, the drain position being a position wherein the hydraulic pressure in the back pressure chamber is drained; a shift solenoid valve which, upon receiving a first instruction signal from the electronic control unit, controls the hydraulic pressure applied to the shift valve; and a timing solenoid valve which, upon receiving a second instruction signal from the electronic control unit, controls the hydraulic pressure applied to the timing valve to cause the timing valve to assume the communication position, the second instruction signal being issued after the first instruction signal.

BRIEF DESCRIPTION OF THE DRAWINGS

Other objects and advantages of the present invention will become apparent from the following description when taken in conjunction with the accompanying drawings, in which:

FIG. 3 is a TABLE showing ON/OFF conditions of various friction elements of the automatic transmission with respect to speeds selected by the transmission;

DETAILED DESCRIPTION OF THE INVENTION

Figure 2:
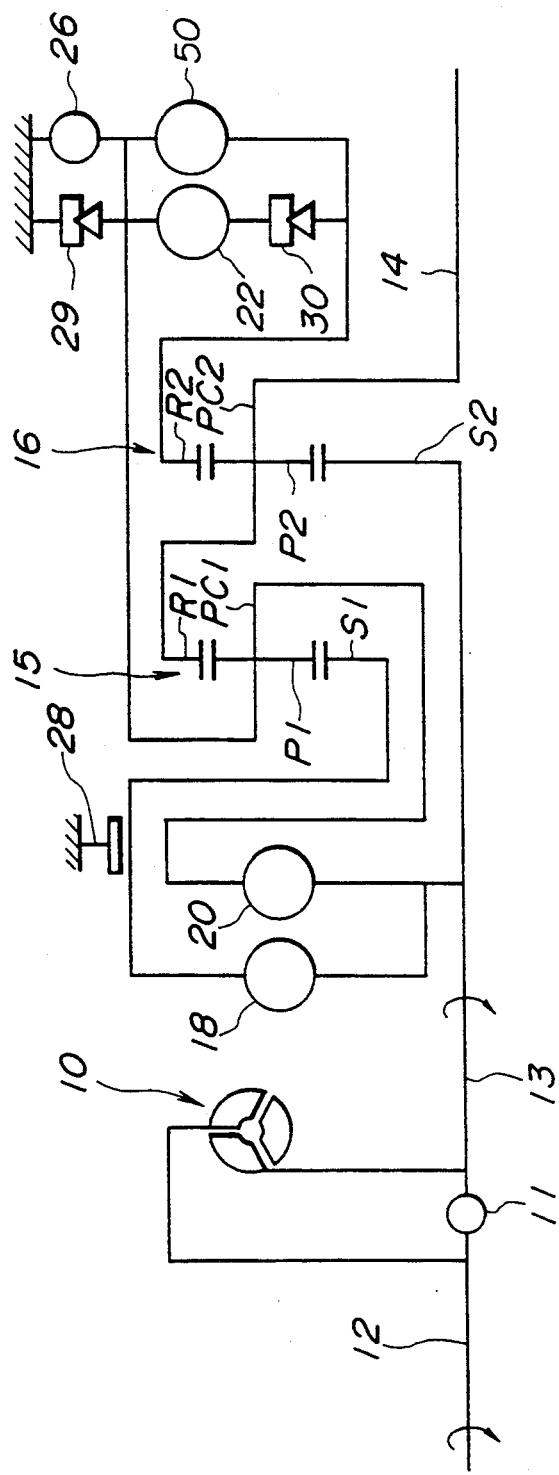
FIG. 2 is a schematic illustration of an automotive automatic transmission to which the present invention is applicable.

Referring to FIG. 2 of the accompanying drawings, there is shown a motor vehicle 1 having an automotive automatic transmission of a type having four forward speeds (one being an overdrive) and one reverse.

The transmission comprises an input shaft 13 to which a torque of an engine output shaft 12 from an engine 12' is transmitted through a torque converter 10. Designated by numeral 14 is an output shaft of the transmission through which a driving force is fed to a final drive device (not shown).

Between the input and output shafts 13 and 14, there are disposed, in the illustrated manner, a first planetary gear unit 15, a second planetary gear unit 16, a reverse clutch 18, a high clutch 20, a low clutch 50, a low-and-reverse brake 26, a band brake 28 and a low-one-way clutch 29.

The torque converter 10 has a lock-up clutch 11 operatively installed therein.

The first planetary gear unit 15 comprises a sun gear S1, an internal gear R1, pinion gears P1 each meshing with both the sun gear S1 and the internal gear R1, and a pinion gear carrier PC1 carrying the pinion gears P1.

The pinion gear carrier PC1 is connectable to the input shaft 13 through the high clutch 20, and the sun gear S1 is connectable to the input shaft 13 through the reverse clutch 18.

The second planetary gear unit 16 comprises a sun gear S2, an internal gear R2, pinion gears P2 each meshing with both the sun gear S2 and the internal gear R2, and a pinion gear carrier PC2 carrying the pinion gears P2.

The pinion gear carrier PC1 of the first planetary gear unit 15 is connectable to the internal gear R2 of the second planetary gear unit 16 through the low clutch 50. The sun gear S2 is constantly connected to the input shaft 13. The internal gear R1 of the first planetary gear 15 and the pinion gear carrier PC2 of the second planetary gear unit 16 are constantly connected to the output shaft 14.

The low-and-reverse brake 26 can fix the pinion gear carrier PC1 of the first planetary gear unit 15 and the band brake 28 can fix the sun gear S1 of the first planetary gear unit 15.

The low-oneway clutch 29 is so arranged as to permit only a normal rotation (viz., the rotation in the same direction as the engine output shaft 12) of the pinion gear carrier PC1 of the first planetary gear unit 15. That is, a reversed rotation of the pinion gear carrier PC1 is suppressed by the clutch 29.

By selectively engaging and disengaging the clutches 18, 20 and 50 and the brakes 26 and 28 in various combinations, the elements (viz., S1, S2, R1, R2, PC1 and PC2) of the first and second planetary gear units 15 and 16 are forced to change their operating conditions. With this changing, the ratio of rotation speed of the output shaft 14 relative to that of the input shaft 13 can be variously changed.

FIG. 3 is a table showing the various gear speeds (viz., first, second, third and fourth forward speeds and a reverse) which are given by the ON/OFF (viz., engaged/disengaged) conditions of the clutches 18, 20 and 22 and the brakes 26 and 28.

In the table, the mark "O" means "ON" (viz., engaged) condition of the associated clutch or brake and "blank" means "OFF" (viz., disengaged) condition of the same. The mark "(O)" means that the engaged condition does not participate in power transmission in the established gear speed. It is to be noted "α1" or "α2" is a ratio of the number of teeth of the sun gear S1 or S2 relative to that of the internal gear R1 or R2, and the "GEAR RATIO" is the ratio of the rotation speed of the input shaft 13 relative to that of the output shaft 14.

Figure 1:
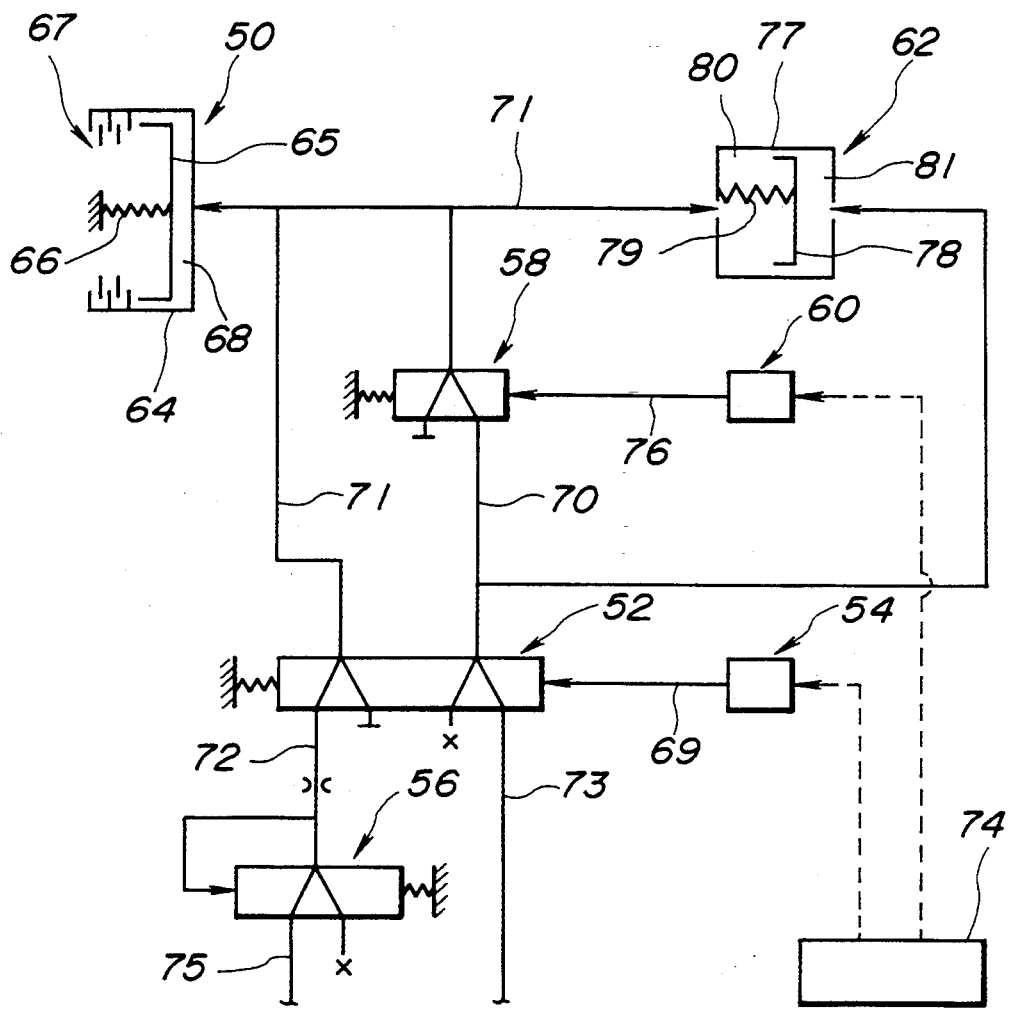
FIG. 1 is a schematically illustrated control circuit showing a first embodiment of the present invention.

Referring to FIG. 1, there is shown a control circuit of a first embodiment of the present invention which controls the operation of the low clutch 50.

The control circuit comprises a 3-4 shift valve 52, a shift solenoid valve 54, a lower pressure adjusting valve 56, a timing valve 58, a timing solenoid valve 60 and a clutch charging accumulator 62, which are connected in the illustrated manner. The low clutch 50 comprises a drum 64, a piston 65, a return spring 66, drive and driven clutch plates 67, and an oil chamber 68. When the oil chamber 68 is supplied with a hydraulic pressure, the piston 65 is moved leftward in the drawing against the return spring 66 to press the drive and driven clutch plates 67 thereby establishing an engagement therebetween. The piston 65 strokes with a certain play. Thus, after the piston 65 makes a movement by a degree corresponding to the play, the piston 65 can actually press the drive and driven clutch plates 67.

The 3-4 shift valve 52 switches between a 4'th speed position (disengaged position) and a 3'rd speed position (engaged position) in accordance with the hydraulic pressure applied thereto from the shift solenoid valve 54 through an oil passage 69. When the 3-4 shift valve 52 takes the 4'th speed position, a second oil passage 70 is connected to a drain port, and at the same time a first oil passage 71 is connected to a third oil passage 72. While, when the 3-4 shift valve 52 takes the 3'rd speed position, the second oil passage 70 is connected to an oil passage 13 to which the line pressure is fed, and at the same time, the first oil passage 71 is blocked.

In accordance with instruction signals applied thereto from an electronic control unit 74, the shift solenoid valve 54 switches between a condition wherein a certain hydraulic pressure is fed to the oil passage 69 and another condition wherein the hydraulic pressure of the oil passage 69 is drained.

The lower pressure adjusting valve 56 can carry out a pressure adjusting operation using a constant pressure which is fed from an oil passage 15. That is, the lower pressure adjusting valve 56 can feed the third oil passage 72 with a very low but constant hydraulic pressure.

In accordance with the hydraulic pressure in the oil passage 76, the timing valve 58 switches between ON position and OFF position. In ON position, the timing valve 58 connects the second oil passage 70 and the first oil passage 71. While, in OFF position, the timing valve 58 shuts off the connection between the second and first oil passages 70 and 71 and thus prevents discharge of the hydraulic pressure from the first oil passage 71.

in accordance with instruction signals applied thereto from the electronic control unit 74, the timing solenoid valve 60 switches between a condition wherein a certain hydraulic pressure is fed to the oil passage 76 and another condition wherein the hydraulic pressure in the oil passage 76 is drained.

The clutch charging accumulator 62 comprises a cylinder 77, a piston 78 and a spring 79. The piston 78 divides the interior of the cylinder 77 into two chambers, which are a first oil chamber 80 and a second oil chamber 81. The first oil chamber 80 is connected with the first oil passage 71, and the second oil chamber 81 is connected with the second oil passage 70. The first oil passage 71 is connected to the oil chamber 68 of the low clutch 50.

In the following, operation of the first embodiment is described.

For ease of understanding, description will be commenced with respect to 4→3 shifting of the transmission.

Under the 4'th speed gear position, the timing solenoid valve 60 assumes the condition to feed a certain hydraulic pressure to the oil passage 76, and the timing valve 58 assumes the shut-off condition. Furthermore, the shift solenoid valve 54 assumes the condition to feed a certain hydraulic pressure to the oil passage 69, and the 3-4 shift valve 52 assumes the 4'th speed position. Accordingly, the hydraulic pressure in the oil passage 70 is drained, and the first oil passage 71 and the third oil passage 72 are connected with each other. Since the lower pressure adjusting valve 56 always feeds the oil passage 72 with the low and constant hydraulic pressure, the low hydraulic pressure is fed from the third oil passage 72 to the first oil passage 71. Although the low hydraulic pressure fed to the first oil passage 71 is supplied to the oil chamber 68 of the low clutch 50, it never occurs that the piston 65 is moved in a direction to effect the engagement of the drive and driven clutch plates 67. This is because the low hydraulic pressure adjusted by the lower pressure adjusting valve 56 is smaller than the force of the return spring 66. That is, under this condition, the piston 65 takes its initial inoperative position, and thus, the low clutch 50 assumes the disengaged condition. Furthermore, the hydraulic pressure of the first oil passage 71 is fed to the first oil chamber 80 of the clutch charging accumulator 62, so that, with an aid of the spring 79, the piston 78 is moved to the rightmost position in FIG. 1 causing the first and second oil chambers 80 and 81 to have the maximum and minimum volumes respectively.

When, under this 4'th speed gear position, the electronic control unit 74 judges a necessity of the 4→3 shifting by analyzing information signals from a throttle valve angle sensor, a vehicle speed sensor and the like, the control unit 74 issues an instruction signal to the shift solenoid valve 54 to switch the same to the condition wherein the hydraulic pressure in the oil passage 69 is drained. With this, the 3-4 shift valve 52 switches to the 3'rd speed position. Thus, the oil passage 73 becomes communicated with the second oil passage 70, and the first oil passage 71 becomes disconnected from the third oil passage 72. Due to communication between the oil passage 73 and the second oil passage 70, the line pressure in the oil passage 73 is fed to the second oil passage 70. The hydraulic pressure fed to the second oil passage 70 is applied to the second oil chamber 81 of the clutch charging accumulator 62, and thus the piston 78 is moved leftward in the drawing against the force of the spring 79. Thus, the oil in the first oil chamber 80 is discharged to the first oil passage 71. Since the first oil passage 71 is blocked by the timing valve 58 and the 3-4 shift valve 52, the oil discharged from the first oil chamber 80 is all fed to the oil chamber 68 of the low clutch 50.

The volume of the first oil chamber 80 of the clutch charging accumulator 62 has been so set as to move the piston 65 of the low clutch 50 by a degree corresponding to the play of the piston. Accordingly, when the piston 78 of the clutch charging accumulator 62 completes the leftward movement, the piston 65 of the low clutch 50 takes a critical position which is ready for effecting the actual pressing against the drive and driven clutch plates 67. Thus, the piston 78 takes and keeps the leftmost position and the piston 65 takes and keeps the critical position.

When, under this condition, the engine speed is increased to a level corresponding to the speed for the 3'rd speed gear position of the transmission, the electronic control unit 74 issues an instruction signal to the timing solenoid valve 60 causing the hydraulic pressure in the oil passage 76 to be drained. Thus, the timing valve 58 switches to the communication position, so that the second oil passage 70 becomes communicated with the first oil passage 71. Accordingly, the line pressure fed to the second oil passage 70 is applied through the timing valve 58 and the first oil passage 71 to the oil chamber 68 of the low clutch 50. Thus, the piston 65 of the low clutch 50 carries out the actual pressing against the drive and driven clutch plates 67 bringing out the engaged condition of the low clutch 50. Since the piston 65 has taken the critical position, the time lag between the time when the electronic control unit 74 issues the instruction signal to he timing solenoid valve 60 and the time when the low clutch 50 completes the engaged condition is very short.

Accordingly, the dispersion of the engaging timing of the low clutch 50, which is caused by temperature change and deterioration of the used oil, is made small and thus the undesired shift shock is suppressed or at least minimized. Furthermore, since the engaging time of the low clutch 50 does not fluctuate, it is unnecessary to increase the time for which the drive and driven clutch plates 67 make a half or incomplete engagement therebetween. Thus, the durability of the high clutch 20 is increased.

In the following, description on 3→4 shifting will be made.

When, under the 3'rd speed gear position having the low clutch engaged, the electronic control unit 74 judges a necessity of the 3→4 shifting, the control unit 74 issues an instruction signal to the shift solenoid valve 54 to permit the same to output a hydraulic pressure to the oil passage 69. With this, the 3-4 shift valve 52 switches to the 4'th speed position connecting the oil passage 70 with the drain port. Accordingly, the hydraulic pressure in the oil chamber 68 of the low clutch 50 is drained through the first oil passage 71, the timing valve 58, the second oil passage 70 and the 3-4 shift valve 52. Thus, the low clutch 50 is disengaged, and at the same time, the band brake 28 (see FIG. 2) is engaged resulting in the 4'th speed gear position of the transmission.

After the disengagement of the low clutch 50, the electronic control unit 74 issues an instruction signal to the timing solenoid valve 60 to change the condition of the same. Thus, the valve 60 outputs a hydraulic pressure to the oil passage 76. With this, the timing valve 58 switches to the OFF (viz., shut-off) position. Furthermore, since, due to the shifting of the 3-4 shift valve 52, the first oil passage 71 and the third oil passage 72 are connected, the first oil passage 71 is supplied with a lower hydraulic pressure which is adjusted by the lower pressure adjusting valve 56. Since the hydraulic pressure in the second oil chamber 81 of the clutch charging accumulator 62 is drained through the second oil passage 70 and the first oil chamber 80 is supplied with the lower hydraulic pressure from the first oil passage 71, the piston 78 is moved to the rightmost position minimizing the volume of the second oil chamber 81 and maximizing the volume of the first oil chamber 80.

Figure 4:
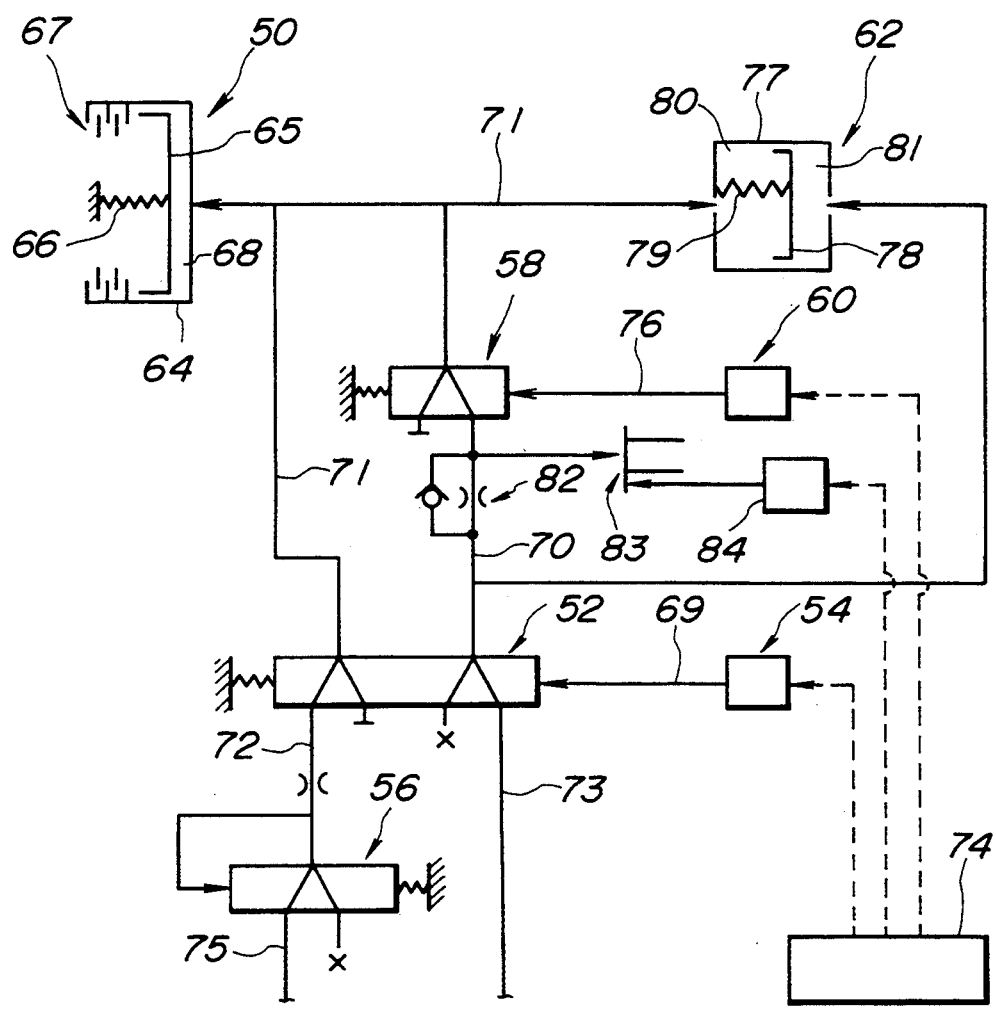
FIG. 4 is a view similar to FIG. 1, but showing a second embodiment of the present invention.

Referring to FIG. 4, there is shown a control circuit of a second embodiment of the present invention.

In this second embodiment, in addition to the parts used in the above-mentioned first embodiment, a one-way orifice unit 82, a low clutch accumulator 83 and an accumulator control solenoid valve 84 are further employed which are arranged in the second oil passage 70 at an inlet side of timing valve 58. Due to these additional parts, the rising rate of the hydraulic pressure fed to the oil chamber 68 of the low clutch 50 is damped and thus reduction of shift shock is achieved. The damping characteristic of the low clutch accumulator 83 the pressure rising is controllable by a certain back pressure which is produced by the accumulator control solenoid valve 84. The accumulator control solenoid valve 84 is controlled by the electronic control unit 74.

Figure 5:
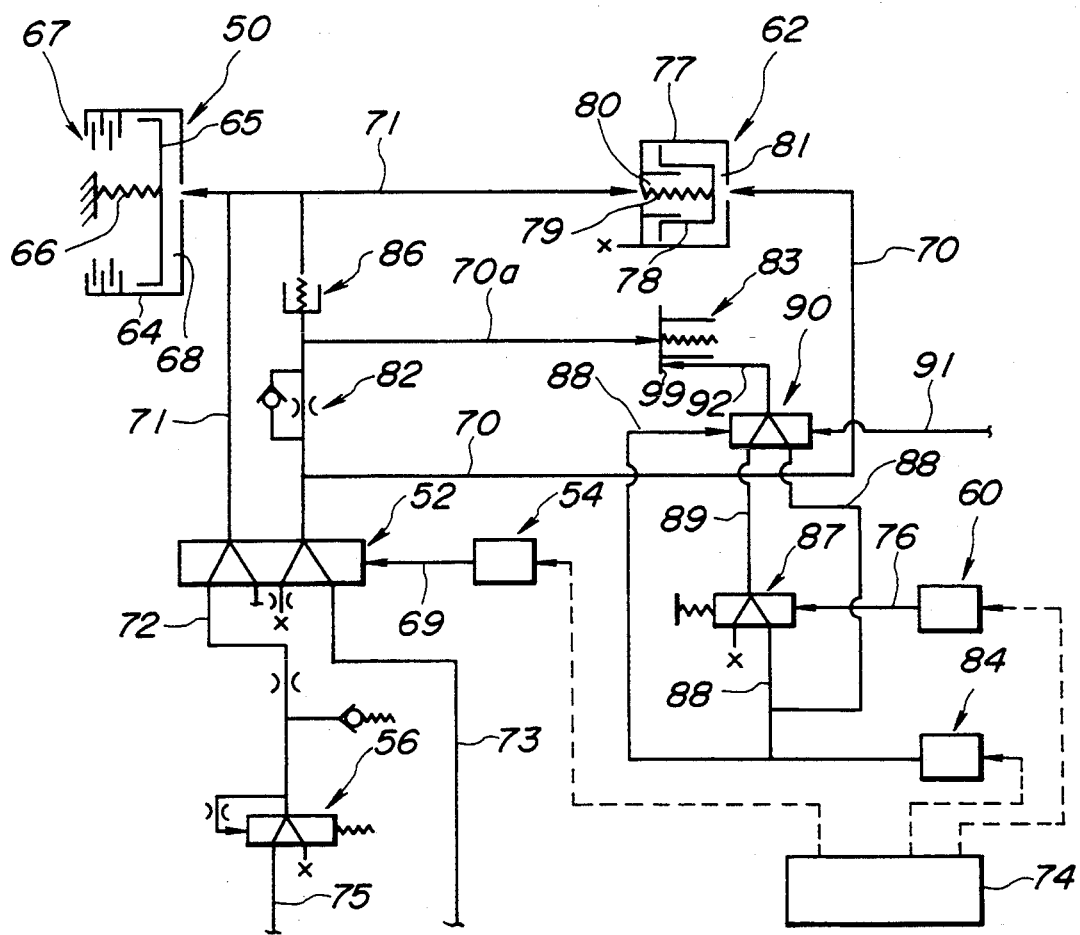
FIG. 5 is a view similar to FIG. 1, but showing a third embodiment of the present invention.

Referring to FIG. 5, there is shown a control circuit of a third embodiment of the present invention.

In this third embodiment, the low clutch 50, the 3-4 shift valve 52, the shift solenoid valve 54, the lower pressure adjusting valve 56, the clutch charging accumulator 62, the electronic control unit 74, the low clutch accumulator 83 and the one-way orifice unit 82 are substantially the same as those of the above-mentioned second embodiment of FIG. 4. Thus, only parts other than such same parts will be described in the following.

The first oil passage 71 and the second oil passage 70 are connected through a one-way valve 86. That is, the one-way valve 86 is so arranged as to permit only a hydraulic flow in a direction from the second oil passage 70 to the first oil passage 71 while blocking a hydraulic flow in a reversed direction. In accordance with the hydraulic pressure outputted from the timing solenoid valve 60 to the oil passage 76, a low clutch timing valve 87 switches between a connecting position wherein oil passages 88 and 89 are connected and a draining position wherein the hydraulic pressure in an oil passage 89 is drained. The oil passage 88 is supplied with a hydraulic pressure from the accumulator control solenoid valve 84. In accordance with a pressure difference between the hydraulic pressure of the oil passage 88 and that of an oil passage 91, a low clutch sequence valve 90 switches between a position wherein the oil passage 88 is connected with an oil passage 92 and another position wherein the oil passage 92 is connected with the oil passage 89. The oil passage 92 is supplied with a certain hydraulic pressure when the transmission takes the 4'th speed gear position. The hydraulic pressure of the oil passage 92 is supplied to a back pressure chamber 99 of the low clutch accumulator 83.

In the following, operation of the third embodiment will be described.

For ease of understanding, description will be commenced with respect to 4→3 shifting of the transmission.

Under the 4'th speed gear position, the 3-4 shift valve 52 assumes the 4'th speed position, and thus the lower hydraulic pressure of the oil passage 72 is fed to the oil passage 71. Accordingly, the oil chamber 68 of the low clutch 50 and the first oil chamber 80 of the clutch charging accumulator 62 are filled with the hydraulic pressure. However, since such lower hydraulic pressure is quite low, the piston 65 of the low clutch 50 is forced to take the rightmost position by the force of the return spring 66 minimizing the volume of the oil chamber 68, and thus, the low clutch 50 assumes the disengaged condition. Because of presence of the one-way valve 86, it never occurs that the hydraulic pressure in the first oil passage 71 is fed to the second oil passage 70.

When, under this 4'th speed gear position, the electronic control unit 74 judges a necessity of the 4→3 shifting, the control unit 74 issues an instruction signal to the shift solenoid valve 54 and thus the 3-4 shift valve 52 switches to the connecting position. Thus, the line pressure in the oil passage 73 is supplied to the oil passage 70 and the hydraulic pressure in the oil passage 70 is supplied to the second oil chamber 81 of the clutch charging accumulator 62. Thus, the piston 78 of the accumulator 62 is moved feeding the hydraulic pressure in the first oil chamber 80 to the oil chamber 68 of the low clutch 50 through the first oil passage 71. Accordingly, the piston 65 of the low clutch 50 takes the critical position ready for effecting the actual pressing against the drive and driven clutch plates 67. Under this condition, the hydraulic pressure in the first oil passage 71 is kept constant in association with the force of the return spring 66. Furthermore, under this condition, the hydraulic pressure in the second oil passage 70 at the portion between the one-way orifice unit 82 and the one-way valve 86 (that is, the portion denoted by reference 70a) is controlled by the low clutch accumulator 83, and thus, the hydraulic pressure in such portion 70a can be smoothly increased. Furthermore, under this condition, the timing solenoid valve 60 outputs a certain hydraulic pressure to the oil passage 76, so that the low clutch timing valve 87 takes the draining position. Furthermore, since the oil passage 91 is supplied with the pressure for the 4'th speed gear position, the low clutch sequence valve 90 takes the position to connect the oil passage 92 with the oil passage 89. Thus, the oil passage 92 connected to the back pressure chamber 99 of the low clutch accumulator 83 is drained through low clutch sequence valve 90, the oil passage 89 and the low clutch timing valve 87. That is, the low clutch accumulator 83 has no back pressure applied thereto. Accordingly, the hydraulic pressure in the oil passage 70a exhibits a very low level. The hydraulic pressure in the oil passage 70a under this condition has been set lower than that in the oil passage 71. Accordingly, the one-way valve 86 does not open.

when, under this condition, the engine speed is increased to a level corresponding to the speed for the 3'rd speed gear position of the transmission, the electronic control unit 74 issues an instruction signal to the timing solenoid valve 60 to change the condition of the same, causing the low clutch timing valve 87 to connect the oil passage 88 with the oil passage 89. Thus, the hydraulic pressure in the oil passage 88 is applied through the low clutch timing valve 87, the oil passage 89, the low clutch sequence valve 90 and the oil passage 92 to the low clutch accumulator 83 as a back pressure. The oil passage 88 is fed with a certain hydraulic pressure which is adjusted by the accumulator control solenoid valve 84. Accordingly, the hydraulic pressure in the oil passage 70a is increased in accordance with the back pressure applied to the low clutch accumulator 83, and thus, the hydraulic pressure in the oil passage 70a becomes higher than that in the oil passage 71. The hydraulic pressure in the oil passage 70a is supplied through the one-way valve 86 to the oil passage 71, and to the oil chamber 68 of the low clutch 50. Thus, the engaging movement of the low clutch 50 instantly starts. That is, when, upon receiving an instruction signal from the electronic control unit 74, the timing solenoid valve 60 is forced to change its condition, the low clutch instantly starts the engaging movement. It is to be noted that when the piston of the low clutch accumulator 83 finishes the stroke, the hydraulic pressure in the oil passage 70a is returned to the level of the line pressure and the returned pressure is applied to the oil chamber 68 of the low clutch 50.

During the 4→3 shifting, the pressure for the 4'th speed gear position applied to the oil passage 89 is lowered and thus the low clutch sequence valve 90 is forced to switch to a position connecting the passage 92 with the oil passage 88. However, the hydraulic pressure supplied to the oil passage 92 is not changed. That is, under this condition, only the hydraulic pressure feeding route is changed.

In the following, description on 3→4 shifting will be made.

When, under the 3'rd speed gear position having the low clutch 50 engaged, the electronic control unit 74 judges a necessity of the 3→4 shifting, the control unit 74 issues instruction signals to the shift solenoid valve 54 and the timing solenoid valve 60 to switch the conditions of them. With this, the 3-4 shift valve 52 takes the disengaged position (viz., 4'th speed position), and thus, the hydraulic pressure in the second oil passage 70 starts to drain through the 3-4 shift valve 52. Accordingly, the hydraulic pressure in the second oil chamber 81 of the clutch charging accumulator 62 is lowered moving the piston 78 rightward in the drawing (FIG. 5). Thus, the hydraulic pressure in the first oil passage 71 is lowered. However, when the hydraulic pressure in the first oil passage 71 becomes lower than that of the oil passage 70a, the hydraulic pressure in the oil passage 70a is forced to flow into the first oil passage 71 through the one-way valve 86. Thus, the hydraulic pressure in the oil chamber 68 of the low clutch 50 is gradually lowered while being controlled by the low clutch accumulator 83. Thus, the low clutch 50 gradually changes its condition from the engaged condition to the disengaged condition. While, during this time, the hydraulic pressure for the band brake 28 (see FIG. 2) is gradually increased and thus the band brake 28 gradually changes its condition from the disengaged condition to the engaged condition. The hydraulic pressure applied to the band brake 28 is applied through the oil passage 91 to the low clutch sequence valve 90, so that when the hydraulic pressure in the oil passage 91 becomes higher than that in the oil passage 88, the low clutch sequence valve 90 changes its condition connecting the oil passage 92 with the oil passage 89. Since the low clutch timing valve 87 is in a condition to drain the oil passage 89, the hydraulic pressure in the oil passage 92 is drained. Accordingly, the back pressure applied to the low clutch accumulator 83 disappears and thus the hydraulic pressure in the oil passage 70a is quickly lowered. As a result, the hydraulic pressure in the first oil passage 71 is quickly reduced to a very low constant level which is adjusted by the lower pressure adjusting valve 56. With this, the low clutch 50 is disengaged, and at the same time, the band brake 28 (see FIG. 2) is engaged resulting in the 4'th speed gear position of the transmission.

As is understood from the foregoing description, in accordance with the present invention, when, due to the instruction by the electronic control unit 74, a certain hydraulic pressure is supplied to the low clutch 50 for achieving the 4→3 shifting, the piston 65 of the clutch 50 has already taken the critical position which is ready for effecting the actual pressing against the drive and driven clutch plates 67. Thus, the engagement of the low clutch 50 is quickly achieved upon such 4→3 shifting.

What is claimed is:

1. In an automotive automatic transmission having a hydraulically operated clutch device, said clutch device including drive and driven clutch plates, means for defining an oil chamber, and a piston for pressing said drive and driven clutch plates to establish an engagement therebetween when said oil chamber is fed with a certain amount of fluid,
    a method for controlling said clutch device, comprising the steps of:
    (a) issuing a first instruction signal when a shifting of the automatic transmission is necessary;
    (b) in response to issuing the first instruction signal, feeding said oil chamber with the fluid in a given amount which is just suitable for moving said piston from a rest position to an engagement starting position at which the fluid is at a first hydraulic pressure and operative engagement between the drive and driven clutch plates begins;
    (c) maintaining the given amount of fluid in said oil chamber at said first hydraulic pressure;.
    (d) issuing a second instruction signal when the automatic transmission is in a predetermined condition that is optimum for shifting; and
    (e) in response to issuing the second instruction signal, increasing said first hydraulic pressure in said oil chamber without an initial hydraulic pressure reduction to cause said piston to instantly establish full engagement between said drive and driven clutch plates.

2. A method as claimed in claim 1, wherein the steps of issuing the first and second instruction signals include the steps of issuing said first and second instruction signals, respectively, when a necessity of 4→3 shifting of the transmission is judged.

3. A method as claimed in claim 1, wherein the step of issuing the first instruction signal includes the steps of issuing said first instruction signal after analyzing a throttle valve angle of an associated internal combustion engine and a speed of the associated motor vehicle.

4. A method as claimed in claim 3, wherein the step of issuing the second instruction signal includes the steps of issuing said second instruction signal after analyzing a rotation speed of said engine.

5. A method as claimed in claim 1, wherein the step of increasing said first hydraulic pressure in said oil chamber includes the steps of damping the increase in hydraulic pressure to reduce a shift shock of the transmission.

6. In an automotive automatic transmission having a hydraulically operated clutch device which includes drive and driven clutch plates, means for defining an oil chamber, and a piston for pressing said drive and driven clutch plates to establish an engagement therebetween when said oil chamber is fed with a certain amount of fluid,
    a control device for controlling said clutch device, comprising:
    an electronic control unit which issues first and second instruction signals after judging that a shifting of the automatic transmission is necessary, said first instruction signal being issued prior to said second instruction signal;
    a first hydraulic circuit which, upon issuance of said first instruction signal, feeds said oil chamber with the fluid in a given amount which is sufficient for moving said piston from a rest position to an engagement starting position at which the fluid is at a first hydraulic pressure and operative engagement between the drive and driven clutch plates begins, said first hydraulic circuit also maintaining said fluid at said first hydraulic pressure without a pressure loss; and
    a second hydraulic circuit which, upon issuance of said second instruction signal, increases said first hydraulic pressure in said oil chamber to cause said piston to instantly establish full engagement between said drive and driven clutch plates.

7. A control device as claimed in claim 6, further comprising damping means for damping the increasing of the hydraulic pressure in said oil chamber.

8. In an automotive automatic transmission having a hydraulically operated clutch device and an electronic control unit, said clutch device including drive and driven clutch plates, means for defining a clutch oil chamber, and a clutch piston for pressing said drive and driven clutch plates to establish an engagement therebetween when said oil chamber is fed with a certain amount of fluid,
    a control device for controlling said clutch device comprising:
    a clutch charging accumulator having first and second oil chambers which are partitioned by a first piston, said first oil chamber being connected through a first oil passage to said clutch oil chamber and said second oil chamber being connected to a second oil passage;
    a lower pressure adjusting valve which is capable of outputting an adjusted hydraulic pressure to a third oil passage;

a shift valve which switches between engaged and disengaged positions in response to a hydraulic pressure applied thereto, said engaged position being a position wherein a line pressure passage is connected with said second oil passage while keeping the hydraulic pressure in said first oil passage, and said disengaged position being a position wherein the hydraulic pressure in said second oil passage is drained while connecting said first and third oil passages;

a timing valve which switches between communication and shut-off positions in response to a hydraulic pressure applied thereto, said communication position being a position wherein said first and second oil passages are connected and said shut-off position being a position wherein the first and second oil passages are disconnected while keeping the hydraulic pressure in said first oil passage;

a shift solenoid valve which, upon receiving a first instruction signal from said electronic control unit, controls the hydraulic pressure applied to said shift valve; and a timing solenoid valve which, upon receiving a second instruction signal from said electronic control unit, controls the hydraulic pressure applied to said timing valve to cause the timing valve to assume said communication position, said second instruction signal being issued after said first instruction signal is issued.

9. A control device as claimed in claim 8, in which said adjusted hydraulic pressure produced by said lower pressure adjusting valve is so set as not to move said clutch piston in a direction to increase said clutch oil chamber even when said adjusted hydraulic pressure is fed to said clutch oil chamber.

10. A control device as claimed in claim 9, in which the first oil chamber of said clutch charging accumulator has the maximum fluid containing volume which is sufficient for moving said clutch piston from a rest position to an engagement starting position at which operative engagement between the drive and driven clutch plates begins.

11. A control device as claimed in claim 10, in which said second oil passage is equipped with damping means for damping the rising rate of hydraulic pressure in said clutch oil chamber.

12. A control device as claimed in claim 11, in which said damping means comprises:

a one-way orifice unit interposed between said timing valve and said shift valve;

a clutch accumulator operatively connected to said second oil passage at a position between said one-way orifice unit and said timing valve; and an accumulator control solenoid valve for controlling said clutch accumulator in response to an instruction signal from said electronic control unit.

13. In an automotive automatic transmission having a hydraulically operated clutch device and an electronic control unit, said clutch device including drive and driven clutch plates, means for defining a clutch oil chamber, and a clutch piston for pressing said drive and driven clutch plates to establish an engagement therebetween when said oil chamber is fed with a certain amount of fluid, a control device for controlling said clutch device, comprising:

a clutch charging accumulator having first and second oil chambers which are partitioned by a first piston, said first oil chamber being connected through a first oil passage to said clutch oil chamber and said second oil chamber being connected to a second oil passage;

a lower pressure adjusting valve which is capable of outputting an adjusted hydraulic pressure to a third oil passage;

a shift valve which switches between engaged and disengaged positions in response to a hydraulic pressure applied thereto, said engaged position being a position wherein a line pressure passage is connected with said second oil passage while keeping the hydraulic pressure in said first oil passage, and said disengaged position being a position wherein the hydraulic pressure in said second oil passage is drained while connecting said first and third oil passages;

a one-way valve arranged between said first and second oil passages, said one-way valve blocking the communication between said first and second oil passages when the hydraulic pressure in said first oil passage is higher than that in said second oil passage, said one-way valve permitting a fluid flow from said second oil passage to said first oil passage when the hydraulic pressure in said second oil passage is higher than that in said first oil passage;

a clutch shock damping accumulator which is arranged to damp the rising race of the hydraulic pressure in said second oil passage;

a timing valve which switches between communication and drain positions in response to a hydraulic pressure applied thereto, said communication position being a position wherein a hydraulic pressure passage for controlling said accumulator is connected with a back pressure chamber of said clutch shock damping accumulator, said drain position being a position wherein the hydraulic pressure in said back pressure chamber is drained;

a shift solenoid valve which, upon receiving a first instruction signal from said electronic control unit, controls the hydraulic pressure applied to said shift valve; and a timing solenoid valve which, upon receiving a second instruction signal from said electronic control unit, controls the hydraulic pressure applied to said timing valve to cause the timing valve to assume said communication position, said second instruction signal being issued after said first instruction signal is issued.

14. A control device as claimed in claim 13, in which said adjusted hydraulic pressure produced by said lower pressure adjusting valve is so set as not to move said clutch piston in a direction to increase said clutch oil chamber even when said adjusted hydraulic pressure is fed to said clutch oil chamber.

15. A control device as claimed in claim 14, in which the first oil chamber of said clutch charging accumulator has the maximum fluid containing volume which is sufficient for moving said clutch piston from a rest position to an engagement starting position at which operative engagement between the drive and driven clutch plates begins.

* * * * *